US012569928B2

(12) United States Patent
Chern et al.

(10) Patent No.: US 12,569,928 B2
(45) Date of Patent: Mar. 10, 2026

(54) METHODS OF MANUFACTURING OF MOLYBDENUM AND MOLYBDENUM-BASED STRUCTURES BY ELECTRON BEAM ADDITIVE MANUFACTURING, PARTICULARLY STRUCTURES FOR NUCLEAR COMPONENTS

(71) Applicant: BWXT Nuclear Energy, Inc., Charlotte, NC (US)

(72) Inventors: Andrew Harrison Chern, Knoxville, TN (US); Travis B. Fritts, Knoxville, TN (US); Daniel Walter Galicki, Knoxville, TN (US); Ryan Scott Kitchen, Knoxville, TN (US); Travis Adam Mcfalls, Knoxville, TN (US); Elizabeth Ellis, Knoxville, TN (US)

(73) Assignee: BWXT Nuclear Energy, Inc., Charlotte, NC (US)

( * ) Notice: Subject to any disclaimer, the term of this patent is extended or adjusted under 35 U.S.C. 154(b) by 520 days.

(21) Appl. No.: 17/752,959

(22) Filed: May 25, 2022

(65) Prior Publication Data

US 2023/0042159 A1 Feb. 9, 2023

Related U.S. Application Data

(60) Provisional application No. 63/226,099, filed on Jul. 27, 2021.

(51) Int. Cl.
B23K 15/00 (2006.01)
B22F 10/28 (2021.01)
(Continued)

(52) U.S. Cl.
CPC .......... B23K 15/0086 (2013.01); B22F 10/28 (2021.01); B22F 12/17 (2021.01);
(Continued)

(58) Field of Classification Search
CPC .. B23K 15/0086; B23K 15/002; B23K 15/06; B23K 37/003; B23K 2103/08;
(Continued)

(56) References Cited

U.S. PATENT DOCUMENTS

2017/0157857 A1    6/2017  Butcher et al.
2018/0214947 A1*   8/2018  Haro Gonzalez ..... B29C 64/153
(Continued)

FOREIGN PATENT DOCUMENTS

WO    2020/223107 A1    11/2020

OTHER PUBLICATIONS

"Additive Manufacturing of Tungsten via Selective Laser Melting and Electron Beam Melting", Jonathan Wright, Jan. 8, 2020 (Year: 2020).*

(Continued)

*Primary Examiner* — John J Norton
*Assistant Examiner* — Dilnessa B Belay
(74) *Attorney, Agent, or Firm* — Morgan, Lewis & Bockius LLP

(57) ABSTRACT

Methodologies and manufacturing processes to manufacture components by electron beam melting additive manufacturing, particularly components of molybdenum or a molybdenum-based alloy and particularly of complex nuclear component geometries. Input parameters are provided for controlling electron beam melting additive manufacturing equipment, such as electron beam melting machines. The input parameters relate to various process steps, including build set-up, initial thermal treatment, initial layering of powder, pre-consolidation thermal treatment, consolidation, post-consolidation thermal treatment, indexing of layers, and post-build thermal treatment. The methodologies and manufacturing processes allow manufacture of components of molybdenum having a purity of ≥99.0% and a density of (Continued)

≥99.75%. Metallographic cross-sections of the manufactured molybdenum components were porosity-free and crack-free.

26 Claims, 7 Drawing Sheets

(51) Int. Cl.

| | |
|---|---|
| *B22F 12/17* | (2021.01) |
| *B23K 15/06* | (2006.01) |
| *B23K 37/003* | (2025.01) |
| *B23K 103/08* | (2006.01) |
| *B33Y 10/00* | (2015.01) |
| *B33Y 40/00* | (2020.01) |
| *G21C 21/00* | (2006.01) |

(52) U.S. Cl.
CPC ............ *B23K 15/002* (2013.01); *B23K 15/06* (2013.01); *B23K 37/003* (2013.01); *B33Y 10/00* (2014.12); *B33Y 40/00* (2014.12); *G21C 21/00* (2013.01); *B22F 2201/20* (2013.01); *B22F 2301/20* (2013.01); *B23K 2103/08* (2018.08)

(58) Field of Classification Search
CPC ..... B33Y 10/00; B33Y 40/00; B22F 2201/20; B22F 2301/20; B22F 10/28; B22F 12/17; G21C 21/00
See application file for complete search history.

(56) References Cited

U.S. PATENT DOCUMENTS

| | | | |
|---|---|---|---|
| 2020/0263978 A1 | 8/2020 | Pieger et al. | |
| 2021/0023793 A1 | 1/2021 | Lofving et al. | |
| 2021/0069781 A1* | 3/2021 | Mizobe ................... | B22F 1/052 |

OTHER PUBLICATIONS

Wright, Jonathan, Additive Manufacturing of Tungsten via Selective Laser Melting and Electron Beam Melting, The University of Shelfield, Jan. 8, 2020 (Year: 2020).*

Körner, "Additive manufacturing of metallic components by selective electron beam melting—a review," International Materials Reviews, 61 (5): 361-377, (2016).
Brown, et al., "Recovery of high specific activity molybdenum-99 from accelerator-induced fission on low-enriched uranium for technetium-99m generators," Scientific Reports, 11: 13292 (2021).
International Search Report issued in International Patent Application No. PCT/US22/30999 dated Feb. 17, 2023.
Balachandramurthi et al., "Additive Manufacturing of Alloy 718 via Electron Beam Melting: Effect of Post-Treatment on the Microstructure and the Mechanical Properties," Materials, 12: 68 (2019).
Wang et al., "Densification and crack suppression in selective laser melting of pure molybdenum," Materials and Design, 129: 44-52 (2017).
Deng, "Additively Manufactured Inconel 718: Microstructures and Mechanical Properties," Licentiate Thesis No. 1798, Linköping Studies in Science and Technology, Linköping University (2018).
Saasi Al-Bermani, "An Investigation into Microstructure and Microstructural Control of Additive Layer Manufactured Ti—6Al—4V by Electron Beam Melting," Doctoral dissertation, The University of Sheffield (2011).
Frederick, "Control Of Grain Structure In Selective-Electron Beam Melting of Nickel-Based Superalloys," Doctoral dissertation, University of Tennessee <<https://trace.tennessee.edu/utk_graddiss/4952>> (2018).
Sames, "Additive Manufacturing of Inconel 718 using Electron Beam Melting: Processing, Post-Processing, & Mechanical Properties," Doctoral dissertation, Texas A&M University <<https://hdl.handle.net/1969.1/155230>> (2015).
Shmelev et al., "Use of molybdenum as a structural material of fuel elements for improving the safety of nuclear reactors," Journal of Physics: Conferenced Series, 781: 012022 (2017).
Welcome to Manufacturing UNBOUND, [Online]. ArcamEBM [retrieved on May 3, 2021]. Retrieved from the Internet: <URL: www.arcamebm.com>.
Written Opinion issued in International Patent Application No. PCT/US22/30999 dated Feb. 17, 2023.
Extended European Search Report issued in European Patent Application No. 22858893.5 dated Jul. 8, 2025.
Rebesan et al., "Pure molybdenum manufactured by Laser Powder Bed Fusion: Thermal and mechanical characterization at room and high temperature," Additive Manufacturing, 47: 102277 (2021).

* cited by examiner

METHODS OF MANUFACTURING OF MOLYBDENUM AND MOLYBDENUM-BASED STRUCTURES BY ELECTRON BEAM ADDITIVE MANUFACTURING, PARTICULARLY STRUCTURES FOR NUCLEAR COMPONENTS

RELATED APPLICATION DATA

This application is based on and claims priority under 35 U.S.C. § 119 to U.S. Provisional Application No. 63/226,099, filed Jul. 27, 2021, the entire contents of which are incorporated herein by reference.

STATEMENT REGARDING FEDERALLY SPONSORED RESEARCH OR DEVELOPMENT

The invention was made with government support under DOE Cooperative Agreement Number DE-NE0008744 awarded by the Department of Energy and under CRADA No. NFE-19-07627 between BWXT Nuclear Energy, Inc. and UT-Battelle, LLC, management and operating contractor for the Oak Ridge National Laboratory for the U.S. Department of Energy. The Government has certain rights in this invention.

TECHNICAL FIELD AND INDUSTRIAL APPLICABILITY

The present disclosure relates generally to methods of manufacturing by electron beam additive manufacturing. In particular, methods of manufacturing pure molybdenum and molybdenum-based structures, including structures for nuclear components, by electron beam additive manufacturing are disclosed.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Advanced reactor concepts, such as the GEN IV Very High Temperature Reactor (VHTR) and the GEN IV Ultra High Temperature Reactor (UHTR), continue to be investigated. Advanced manufacturing processes are being investigated to support such advanced reactor concepts. For example, one advanced manufacturing process of interest is additive manufacturing using electron beam melting technologies. Of particular interest is advanced manufacturing processes for complex nuclear component geometries.

Additionally, in nuclear applications, manufacture of nuclear components having compositions that are molybdenum or a molybdenum-based alloy are of interest due to molybdenum's high melting temperature. For example molybdenum can be used as a structural material of fuel elements, which can contribute to improving the safety of nuclear reactors.

However, the methodologies and manufacturing processes to successfully manufacture nuclear components, particularly nuclear components of molybdenum or a molybdenum-based alloy, by electron beam melting additive manufacturing have not been developed. Thus, many aspects and parameters related to advanced manufacturing processes of specific materials by specific manufacturing processes are unknown and remain a barrier to implementation of advanced manufacturing processes in this technical area.

SUMMARY

The present disclosure provides methodologies and manufacturing processes to manufacture nuclear components by electron beam melting additive manufacturing, particularly nuclear components of molybdenum or a molybdenum-based alloy and particularly of complex nuclear component geometries. This can include input parameters for controlling electron beam melting additive manufacturing equipment, such as electron beam melting machines. Variables and inputs are disclosed related to various process steps, including build set-up, initial thermal treatment, initial layering of powder, pre-consolidation thermal treatment, consolidation, post-consolidation thermal treatment, indexing of layers, and post-build thermal treatment.

In an embodiment of a method to manufacture a component by electron beam melting additive manufacturing, the method comprises a build set-up step including seating a start plate on a powder bed within a reaction zone of a vacuum chamber of an electron beam melting additive manufacturing machine, wherein the powder bed includes a first powder; an initial thermal treatment step including positioning the start plate at a plate offset distance, heating the start plate to a first temperature, holding the start plate at the first temperature, and sintering a portion of the powder bed on which the start plate is seated; covering at least a portion of a build surface of the start plate with a base layer of the first powder; a pre-consolidation step including a first heating step in which the base layer is heated to a first preheat temperature and a second heating step in which the base layer is heated to a second preheat temperature, wherein the second preheat temperature is higher than the first preheat temperature, and wherein the first preheat temperature agglomerates the first powder of the base layer and the second preheat temperature densifies a portion of the agglomerated first powder; a consolidation step including sintering a current layer of the component from the densified portion of the agglomerated first powder; and a post-build step including a cool-down step.

In some embodiments, one or both the start plate and the powder(s) (used in the electron beam melting additive manufacturing process) has a composition consisting of molybdenum having a purity of 99.0% or higher, alternatively 99.3% or higher or 99.5% or higher, such as 99.1%, 99.2%, 99.3%, 99.4%, 99.5%, 99.6%, 99.7%, 99.8%, or 99.9% purity. Using a start plate with a composition aligned with the composition of the additive manufacturing powder(s) was observed to minimize and/or avoid intermetallic phases that form when molybdenum-based additive manufacturing powder(s) were deposited onto a non-molybdenum-based start plate, such as a stainless steel or titanium start plate.

In some embodiments, the method can manufacture a nuclear component of molybdenum or a molybdenum-based alloy, in particular having a density of 99.75% or higher, such as 99.75%, 99.76%, 99.77%, 99.78%, 99.79%, 99.80%, 99.81%, 99.82%, 99.83%, 99.84%, 99.85%, 99.86%, 99.87%, 99.88%, 99.89%, 99.90%, 99.91%, 99.92%, 99.93%, 99.94%, 99.95%, 99.96%, 99.97%, 99.98%, 99.99% A or 100% dense. In some embodiments, the nuclear component has a complex geometry, such as fuel cladding components with thin 1 mm thick, alternatively as thin as 500 micron) walls, twisting internal flow channels, and walls with variable thicknesses.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

Figure 1:
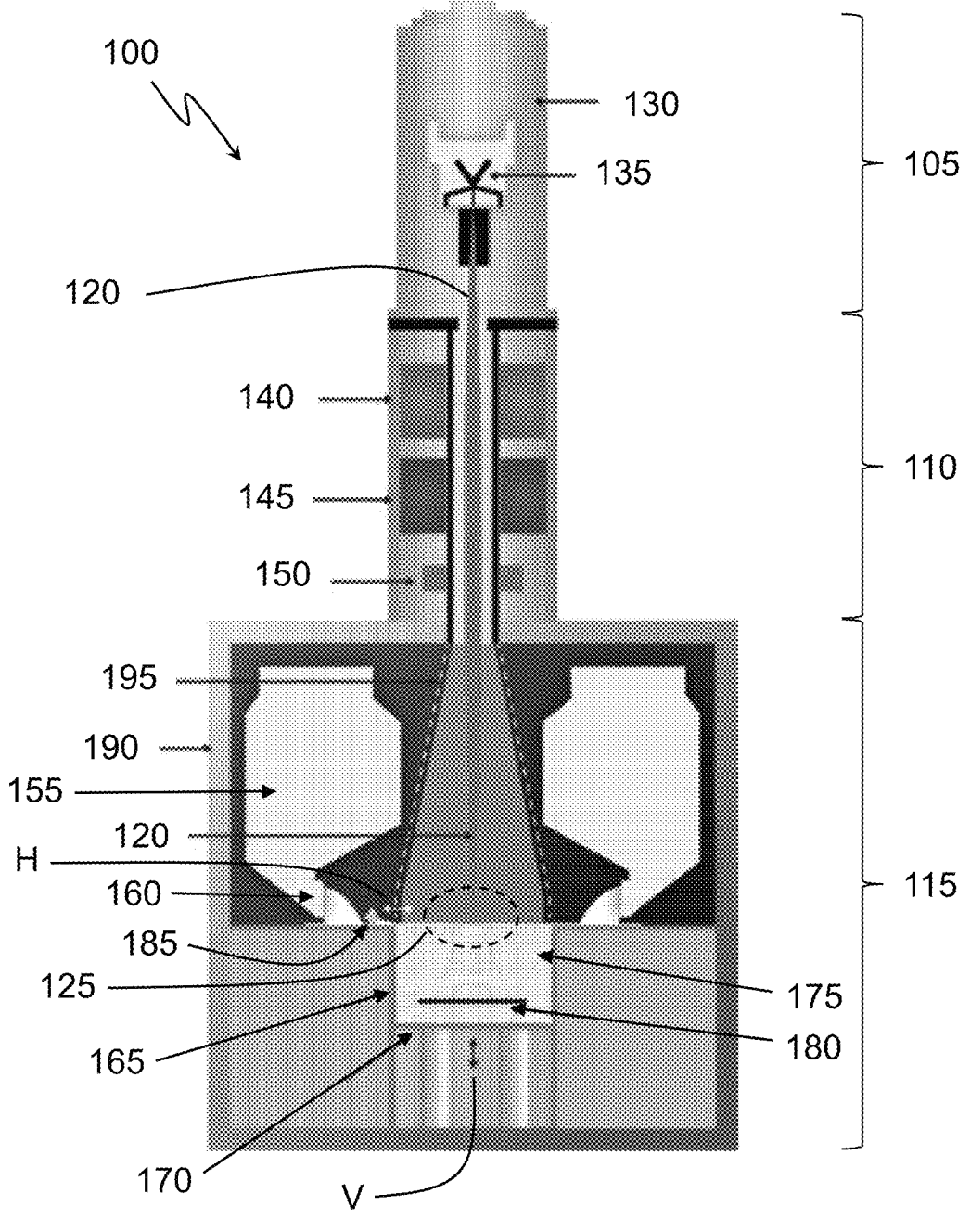
FIG. 1 is a schematic representation of an electron beam melting machine showing the internal arrangement of various components.

In some instances, dimensions of respective constituent elements are appropriately adjusted for clarity. For ease of viewing, in some instances only some of the named features in the figures are labeled with reference numerals.

DETAILED DESCRIPTION

Electron Beam Melting (EBM) technology is a powder-bed-fusion (PBF) additive manufacturing (AM) technology that utilizes a high-powdered electron beam to selectively sinter and melt metal powder layer-by-layer, ultimately creating a fully dense, three-dimensional part. FIG. 1 is a schematic representation of an electron beam melting machine (EBM machine) showing the internal arrangement of various components. The EBM machine 100 includes an electron beam generating section 105, an electron beam focusing section 110, and a deposition section 115. In general, the electron beam generating section 105, the electron beam focusing section 110, and the deposition section 115 are assembled together so that the electron beam 120 from the electron beam generating section 105 propagates through the electron beam focusing section 110 to the reaction zone 125 within the deposition section 115.

The electron beam generating section 105 is typically in the form of an electron beam column 130 containing an electron beam source 135 (such as a filament) that, when powered, generates an electron beam 120. Other subassemblies associated with the electron beam column include vacuum control equipment and viewing systems (not shown).

The electron beam focusing section 110 includes structures to focus, deflect, and steer the electron beam 120, including an astigmatism lens 140, a focus lens 145, and a deflection lens 150.

The deposition section 115 includes one or more powder sources 155, such as a reservoir or hopper, that are connected by a conduit 160 to supply powder to a build tank 165. Within the build tank 165 is a translatable build platform 170 (typically translatable in the vertical direction as indicated by arrow V) and a powder bed 175. A start plate 180 is located within the powder bed 175 and, as the build platform 170 translates and more powder is added to the powder bed 175 from the powder sources 155, the start plate 180 (and a component being built on the start plate 180) becomes embedded in the powder of the powder bed 175. A translatable arm 185 or similar device such as a rake or a doctor blade (typically translatable in the horizontal direction as indicted by arrow H) helps to supply powder to the build tank and to distribute and level each additional layer of powder during the sequential additive manufacturing process. The reaction zone 125 is typically the portion of the powder bed 175 which interacts with the incident electron beam 120 to additively manufacture the current layer of the component being built on the start plate 180. The deposition section 115 is, typically, contained within a vacuum chamber 190 or other structure to allow control of the atmosphere at the reaction zone 125. A heat shield 195 is positioned between the path of the incident electron beam 120 and the powder source(s) 155.

A controller (not shown) provides operative communication and control to the various components of the EBM machine to deposit material, such as a metal, on the start plate 180 on a layer-by-layer basis to manufacture objects of almost any shape or geometry using digital model data, for example, a 3D model or another electronic data source such as a computer-aided design (CAD) model or an Additive Manufacturing File (AMF) file or a stereolithography contour (STL) file.

An example EBM machine is commercially available from Arcam EBM, a GE Additive Company.

Figure 2:
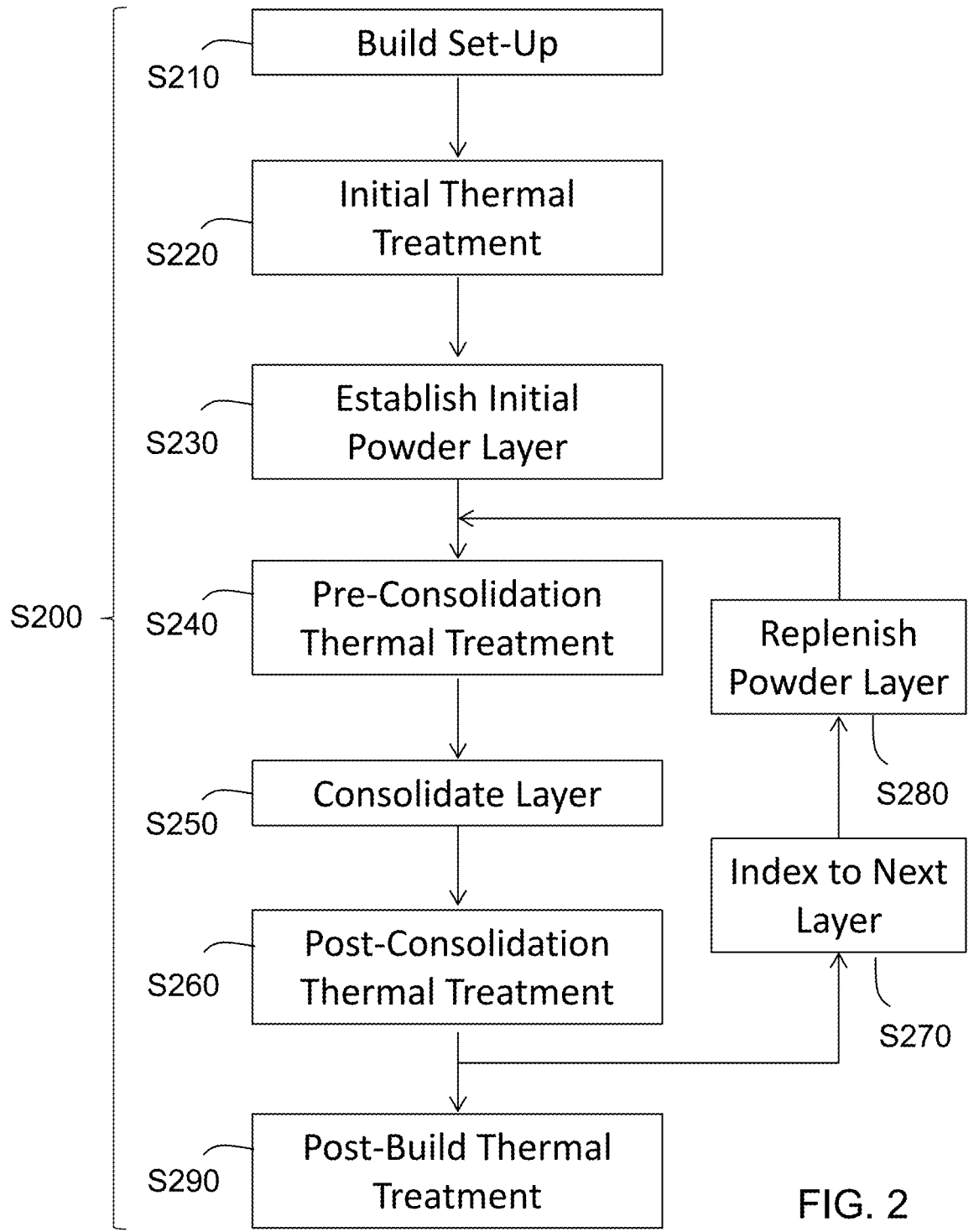
FIG. 2 is a flow diagram setting forth basic steps in an embodiment of a method of manufacturing components by electron beam additive manufacturing.

An EBM machine can be used to manufacture components. In exemplary embodiments, the method of manufacture uses electron beam melting additive manufacturing equipment, such as an EBM machine, to additively manufacture a nuclear component. FIG. 2 is a flow diagram setting forth basic steps in an embodiment of a method of manufacturing components by electron beam additive manufacturing using an EBM machine. The illustrated method S200 has various process steps including a build set-up step S210, an initial thermal treatment step S220, a step establishing an initial powder layer S230, a pre-consolidation thermal treatment step S240, a consolidation step S250, a post-consolidation thermal treatment step S260, and a post-build thermal treatment step S290.

The process steps of the illustrated method S200 also includes a series of steps to effect the sequential build-up of layers via additive manufacturing to produce the component. For example, for each layer, after the post-consolidation thermal treatment step S260 and before the post-build thermal treatment step S290, there is included in the method S200 a step to index to the next layer S270 and a step to replenish the powder layer S280, after which the process steps of the pre-consolidation thermal treatment step S240, the consolidation step S250, and the post-consolidation thermal treatment step S260 occur. The indexing step S270, the replenishment step S280, the pre-consolidation thermal treatment step S240, the consolidation step S250, and the post-consolidation thermal treatment step S260 are repeated a plurality of times until the component is in a final form. Although the number times these steps are repeated depends on the size of the component being manufactured and the thickness of each deposited layer, example numbers of times these steps are repeated include from 2 to 10,000 times, with the thickness of each deposited layer ranging up to 80 microns, alternatively ranging from 40 to 70 microns, or 45 to 55 microns, or about 50 microns (i.e., 50±1.5 microns). In the process with sequential build-up of layers, the post-build thermal treatment step S290 occurs after completing the post-consolidation thermal treatment step S260 for the final layer.

The build set-up step S210 readies the EBM machine for operation. In exemplary embodiments, the EBM machine was adapted to manufacture components having the compositions disclosed herein by using a start plate 180 that substantially matches or matches the composition of the material to be deposited. For example, for manufactured components having a composition consisting of molybdenum, the composition of the start plate 180 also consisted of molybdenum and for manufactured components having a composition consisting essentially of molybdenum, the composition of the start plate 180 also consisted essentially of molybdenum or a molybdenum-based alloy. Similarly, for manufactured components having a composition consisting of a molybdenum-based alloy, the composition of the start plate 180 also consisted of the molybdenum-based alloy and for manufactured components having a composition consisting essentially of a molybdenum-based alloy, the composition of the start plate 180 also consisted essentially of the molybdenum-based alloy. In each of these cases, the purity levels of the composition of the material to be deposited and of the composition of the start plate could be different, as long as those purity levels were within the ranges disclosed herein, e.g., 99.0% or higher. In alternative embodiments, the composition of the start plate is molybdenum tungsten alloys or molybdenum rhenium alloys, e.g., $Mo_2W$ or $Mo_2Re$. Without being bound to theory, using a start plate with a composition aligned with the composition of the additive manufacturing powder(s) was observed to minimize and/or avoid intermetallic phases that form when molybdenum (or molybdenum-based) additive manufacturing powder(s) were deposited onto a non-molybdenum (or non-molybdenum-based) start plate, such as a stainless steel or titanium start plate.

In exemplary embodiments, the EBM machine was adapted to manufacture components having the compositions disclosed herein by increasing the thermal isolation of the start plate 180 so that heat transfer from the start plate 180 to the surrounding environment was reduced as compared to conventional EBM machines. Typically, EBM machines are designed for the start plate to be seated on pins located on a bottom surface of the build tank or on an inner surface of the translatable build platform, i.e., on the surface of the translatable build platform that faces the volume in which the powder bed forms during operation. In contrast, in exemplary embodiments disclosed herein, the start plate 180 is directly seated on a layer of powder. Typically, the powder has the same composition as the powder to be used to manufacture the component. This layer of powder occupies the space between the start plate 180 and, e.g., the inner surface of the translatable build platform 175. In exemplary embodiments, this layer of powder has a thickness of 5 to 20 millimeters (mm), alternatively 7 to 15 mm or 8 to 12 mm, or 10 mm. Also typically, the powder in the layer of powder has a $d_{90}$ particle size of less than or equal to 100 microns ($d_{90} \leq 100$ µm), alternatively 85 to 90 microns; a $d_{10}$ particle size of equal to or greater than 40 microns ($d_{10} \geq 40$ µm), alternatively 45 to 50 microns; and a $d_{50}$ particle size of 70 microns ($d_{50}=70$ µm), alternatively 65 to 75 microns or 68 to 72 microns. In some embodiments, the powder in the layer of powder is the same as the powder in the feedstock used in the additive manufacturing process, including having the same composition and the same particle sizes, i.e., same $d_{90}$ particle size, $d_{10}$ particle size, and $d_{50}$ particle size.

When seating the start plate 180 on the layer of powder, the start plate 180 is also arranged to be located within the reaction zone 125. In exemplary embodiments, the start plate 180 is arranged within the reaction zone so that the dimensions of the part to be manufactured are contained within the operating range of the electron beam.

The initial thermal treatment step S220 readies the start plate for deposition of an initial layer by the EBM machine. For example, the initial thermal treatment step S220 can include heating the start plate to a specific temperature and, when building on top of a powder bed, maintaining that temperature for a period of time to sinter the powder under the start plate so as to form a solid base beneath the start plate.

In exemplary embodiments, the initial thermal treatment step S220 includes positioning the start plate at a plate offset distance. The plate offset distance is an initial plate height adjustment to account for thermal expansion of the start plate during start plate heating. The plate offset distance is dependent on the material of the start plate and the temperature to which the start plate is heated.

In exemplary embodiments, the initial thermal treatment step S220 includes heating the start plate to a first temperature. Heating to the first temperature thermal equilibrates the start plate for subsequent deposition of the layers to form the component. The first temperature can be in the range of 1030° C. to 1080° C., depending on the operating conditions for the electron beam and the expected temperatures during deposition. The temperature of the start plate 180 is monitored by a thermocouple in contact with the start plate 180. In exemplary embodiments, the electron beam 120 impinges on the start plate 180 to heat the start plate 180 to the first temperature.

In exemplary embodiments, the initial thermal treatment step S220 includes holding the start plate at the first temperature and sintering a portion of the powder bed on which the start plate is seated, i.e., the layer of powder that occupies the space between the start plate 180 and, e.g., the inner surface of the translatable build platform 175. The holding time is sufficient to sinter the portion of the powder bed on which the start plate is seated so that the sintered powder provides a stable base for subsequent deposition of the layers to form the component.

For example, the initial thermal treatment step S220 can include rasterizing the electron beam 120 across the surface of the start plate 180 until the thermocouple attached to the start plate indicates a temperature of between 1000° C. and 1300° C. for a period of 20 to 40 minutes, such as 1040° C. for a period of 30 minutes.

The following Table 1 includes values for parameters applicable to an exemplary embodiment of an initial thermal treatment step S220 when using a start plate 180 having a composition consisting of ≥99% pure molybdenum in the shape of a disc having a diameter of 110 mm and a thickness of 8 to 12 mm, alternatively 10 mm.

TABLE 1

| Values for Select Parameters of Initial Thermal Treatment Step | |
| --- | --- |
| Parameter | Value |
| First Temperature (deg C.) | min 1040, alternatively 1040 to 1350 |
| Time At First Temperature (minutes) | 25 to 35, alternatively 30 |
| Plate Offset Distance (mm) | max 0.3, alternatively 0.1 to 0.3 |

The step of establishing an initial powder layer S230 takes powder supplied from the powder source(s) 155 and establishes a base layer over the start plate 180. The supplied powder covers at least a portion of a build surface of the start plate 180 with the base layer of the first powder; alternatively, the supplied powder covers the entire build surface of the start plate 180 with the base layer of the first powder. The build surface is that surface of the start plate 180 on which the deposition of the layers to form the component occurs.

The base layer can be established by suitable means. In one exemplary embodiment, powder from the powder source(s) 155 is positioned in the vicinity of the powder bed and a translatable arm 185 or similar device such as a rake or a doctor blade translates across the surface of the powder bed (typically in the horizontal direction) to distribute the supplied powder in a layer across the top surface of the powder bed and thus creating the base layer. This base layer has a thickness corresponding to the distance between the top layer of the existing powder bed and the lower limiting surface of the translatable arm 185. In exemplary embodiments, the base layer has a thickness ranging from 40 to 70 microns, or 45 to 55 microns, or about 50 microns (i.e., $50\pm1.5$ microns).

In some embodiments, the powder in the base layer (as well as in subsequent build layers) is the same as the powder in the layer of powder beneath the start plate 180, including having the same composition and the same particle sizes, i.e., same $d_{90}$ particle size, $d_{10}$ particle size, and $d_{50}$ particle size.

Figure 3:
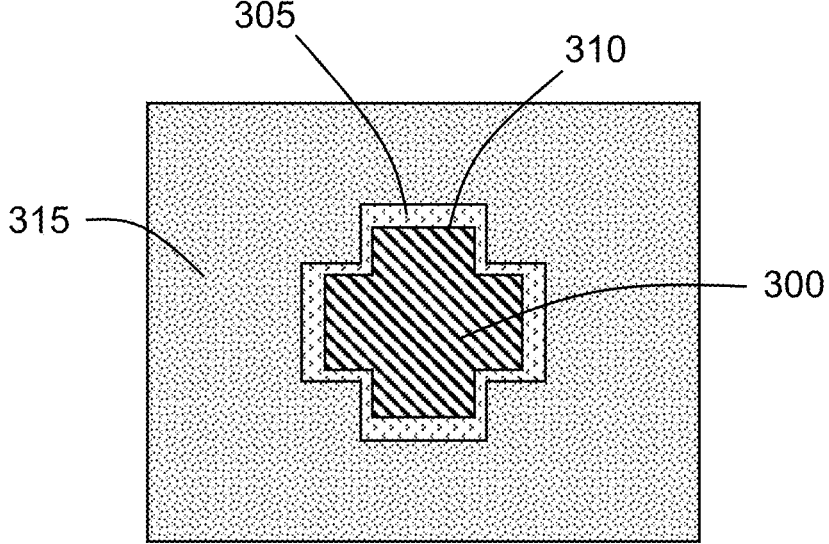
FIG. 3 is a top view of the reaction zone and schematically illustrates the powder bed, the densified powder, and the layer of a component being manufactured.

The pre-consolidation thermal treatment step S240 occurs at each layer and contributes to maintaining the build at a certain temperature and to slightly sintering each new layer of powder, prior to consolidation, to minimize or prevent the buildup of static charge and the ejection of particles form the powder bed (a phenomena known as "smoking"). In exemplary embodiments, the pre-consolidation thermal treatment step S240 is a two-step heating process. In a first heating step, the powder layer (either the base layer of the subsequent build layer) is heated to a first preheat temperature to agglomerate the powder of the powder layer. In a second heating step, the base layer or a portion of the base layer is heated to a second preheat temperature (where the second preheat temperature is higher than the first preheat temperature) to densify a portion of the agglomerated first powder. The area of the densified portion of the agglomerated first powder has a boundary enclosing an area in which the current layer of the component is to be formed. In some embodiments, the boundary of the area of the densified portion of the agglomerated first powder can have a shape that is conformal to the shape of the current layer of the component to be formed. For example, if the current layer of the component to be formed has the shape of a circle, then the boundary of the area of the densified portion of the agglomerated first powder also forms a circle, albeit with a larger diameter so that it is offset from the periphery of the circle of the current layer of the component to be formed. As an example, FIG. 3 is a top view of the reaction zone and schematically illustrates at 300 the current layer of the component being formed, at 305 the area of the densified agglomerated first powder with boundary 310, and the powder bed 315.

The following Table 2 includes values for parameters applicable to an exemplary embodiment of a heating step of a pre-consolidation thermal treatment process when using a start plate 180 having a composition consisting of ≥99% pure molybdenum in the shape of a disc having a diameter of 110 mm and a thickness of 8 to 12 mm, alternatively 10 mm, and a powder having a composition of 99.97 wt % Mo, 0.010 wt % O, 0.0030 wt % C, 0.015 wt % W, 0.0010 wt % Si, and 0.0005 wt % equal parts S, N, and Fe. The average particle diameter is $65.13\pm12.66$ μm with a particle size distribution where D10, D50, and D9 are equal to 49.61 μm, 63.89 μm, and 81.95 μm, respectively. The heating step of a pre-consolidation thermal treatment process can be performed in two distinct steps, i.e., a first step "Preheat I" and a second step "Preheat II." In Table 2, the parameters listed under Preheat I & II (Common) are common to both Preheat I and Preheat II steps and the parameters listed under the Preheat I and Preheat II are specific to the identified steps, i.e., either the Preheat I step or the Preheat II step. With reference to FIG. 3, Preheat I is applicable to the area of the powder bed 315 and Preheat II is applicable to the area of the densified agglomerated first powder 305.

TABLE 2

| Values for Select Parameters of a Heating Steps of Different Pre-Consolidation Thermal Treatment Processes | |
| --- | --- |
| Parameter | Value |
| Preheat I & II (Common) | |
| Build | 21 |
| Max Current for Box (milliamps) | 100 |
| Box Size (mm²) | 65 |
| Focus Offset (milliamps) | 375 |
| Line Offset (mm) | 1 |
| Line Order | 10 |
| Snake | FALSE |
| Heat Loss Factor | 0 |
| Preheat I | |
| Minimum Current (milliamps) | 20 |
| Max Current (milliamps) | 45 |
| Total Repetitions* | 175 |
| Maximum Number of Sweeps | 300 |
| Number of Sweeps at Max Current | 50 |
| Beam Speed (mm/s) | 20,000 |
| Preheat II | |
| Minimum Current (milliamps) | 40 |
| Max Current (milliamps) | 45 |
| Total Repetitions* | 10 |
| Maximum Number of Sweeps | 30 |
| Number of Sweeps at Max Current | 1 |
| Beam Speed (mm/s) | 16,100 |

*Indicates the number of recurrences where the beam scans the entire preheat area while ramping up the current from minimum to maximum current.

The above parameters in Table 2 can be adjusted by a user to provide heat input to the system to effect a successful melt.

The consolidation step S250 includes sintering a current layer of the component from the densified portion of the agglomerated first powder. For each layer, the consolidation step is an autonomous electron beam melting action of consolidating a new layer of powder to the previously-formed layer through electron beam melting. Of the various parameters associated with the consolidation step, it was determined that the melt parameters associated with energy density, energy input, and geometric accuracy had the most material effect on the process. Accordingly, exemplary embodiments of the consolidation step S250 include the parameters of: Focus Offset, Beam Current, Speed Function, Current Compensation, and Turning Points Function.

The beam Focus Offset (FO), measured in mA, controls the focal point of the electron beam such that focal point is at, above, or below the build surface and has a large influence on the energy input. It describes the current applied to the focus coil in the beam column where a Focus Offset value of 0 mA yields the most focused beam at the build surface. Exemplary values of the Focus Offset parameter are 20 to 30. Other values of the Focus Offset parameter may be used as long as such values provide enough energy to create a melt pool, and therefore a solid part.

The Beam Current, measured in milliamps (mA), provides the energy source for melting the metal powder. Exemplary values of the Beam Current parameter are 2 mA to 30 mA. In general, current that falls outside of this range will fail to melt the part with too little energy or create a melt pool too large for the geometry being produced.

The Speed Function controls the relationship between the beam speed and beam current. It is designed to maintain a constant melt pool. In general, the greater the value for the Speed Function, the greater the beam speed for similar beam currents. Exemplary values of the Speed Function parameter are 2 to 10, alternatively 2 to 8 or 3 to 8. For molybdenum having a purity of 99.0% or higher, an example Speed Function is 5.

The Current Compensation is a mathematical model which alters the hatch-melt beam current as a function of the length of line being melted (the line scan length). This function changes the beam current to account for large and small areas within the same 2D slice of a part. Exemplary values of the Current Compensation parameter are set such that the ratio of ref scan line to beam current is as high as 1.35 and as low as 0.5. In general, values of the Current Compensation parameter that are below this range create issues with longer build times and the amount of energy being produced, while values of the Current Compensation parameter that exceed this range create issues with variable line spacing of adjacent melt pools.

The Turning Point Function is a mathematical model which alters the traverse speed of the beam as it changes direction and moves away from an edge of a part. The Turning Point Function is used to prevent overheating at the edges of the part, which can adversely affect the build quality. Exemplary values of the Turning Point Function parameter are set with a Pre-exponent Factor of 0.5 to 1.3 and an Exponential Factor I of 0.0002 to 0.001. In general, values of the Turning Point Function that result in too much energy going into the system results in the corners not be geometrically accurate or swelling on early layers, while values of the Turning Point Function that result in too little energy going into the system results in the corners not make contacting with the underlying layer.

The following Table 3 includes values for parameters applicable to an exemplary embodiment of a consolidation step when using a start plate 180 having a composition consisting of ≥99% pure molybdenum in the shape of a disc having a diameter of 110 mm and a thickness of 8 to 12 mm, alternatively 10 mm, and a powder having a composition of 99.97 wt % Mo, 0.010 wt % O, 0.0030 wt % C, 0.015 wt % W, 0.0010 wt % Si, and 0.0005 wt % equal parts S, N, and Fe. The average particle diameter is 65.13±12.66 μm with a particle size distribution where D10, D50, and D9 are equal to 49.61 μm, 63.89 μm, and 81.95 μm, respectively.

TABLE 3

Values for Select Parameters of Consolidation Step

| Parameter | Value |
|---|---|
| Focus Offset** | 5 |
| Speed Function | 5 |
| Current Compensation*** | 14.1421 |
| Scan Length Reference (SLR) (mm), | 11.6525 |
| RefCurrrent (mA), MinCurrent (mA), MaxLength | 2 |
| (mm), PropK | 500 |
|  | 1 |
| Turning Points [TP, value] | True, (see Table 4) |

**The Focus Offset parameter defines the current applied to the electromagnetic focus coil in the electron beam column. It controls the diameter of the bed at the surface of the powder bed by altering the beam focal point in a similar fashion to an optic lens.
***The Current Compensation ($i_{cc}$) function alters the beam current adjusting for the geometric length of the corresponding beam scan path. The function increases or decreases the beam current from its reference value as the geometric length of the beam scan path increases or decreases from the Scan Length Reference value.

$$i_{melt} = i_{CC}(l) = i_{Ref} * \left(1 + PropK \frac{l - ScanLengthReference}{ScanLengthReference}\right)$$

TABLE 4

Values for Turning Point Inputs

| Turning Point# Inputs | Value |
|---|---|
| Exponential Factor 1 ($EF_1$) | 0.0004 |
| Exponential Factor 2 ($EF_2$) | 0 |
| Pre Exponent Factor (PEF) | 0.9 |

The Turning Point Function is a mathematical model which increases the speed of the beam ($v_{beam}$) as it approaches, turns, and comes out of an edge of a part:

$$v_{Beam} = v_{input} * \left[1 + PEF * e^{-v_{input}\left(\left(EF_1 * \frac{l}{0.1}\right) - EF_2 * v_{input}\right)}\right]$$

The above parameters in Tables 3 and 4 can be adjusted by a user to provide heat input to the system to effect a successful melt.

Additionally, the raster direction during the consolidation step can include an angular rotation designed to eliminate compound stress due to repeated thermal escalation in localized areas of the component being manufactured. For example, the repetitive nature of the ebeam rastering pattern using 90 degree rotation can cause geometric-dependent swelling and build failure, particular in straight-line applications. Therefore, is some embodiments, an angular rotation to reduce the repetitive nature can be used. For example, one can select a non-90 degree angular rotation that will repeat itself on a much less frequent basis. For example, a value of angular rotation based on a prime number will repeat only once every 360 layers. In other embodiments, a value of angular rotation based on an integer multiple of a prime number can be used. For example, a 66 degree angular rotation (multiple of 6 times prime number 11) will repeat every 60 layers.

In another embodiment relevant for thin-walled objects, a pattern can be used that deposits material for the thin wall in a direction consistent with the orientation (within 10 degrees of orientation) that is along the wall direction, i.e., along the length of the wall (as opposed to transverse to the wall direction, i.e., in the thickness direction).

Additional information on Current Compensation ($i_{cc}$) function can be found in Sames, William (2015). "Additive Manufacturing of Inconel 718 using Electron Beam Melting: Processing, Post-Processing, & Mechanical Properties." Doctoral dissertation, Texas A & M University. https://hdl.handle.net/1969.1/155230, the entire contents of which are incorporated herein by reference. Additional information on Turning Point Function can be found in Frederick, Curtis Lee, "Control Of Grain Structure In Selective-Electron Beam Melting Of Nickel-Based Superalloys." PhD diss., University of Tennessee, 2018. https://trace.tennessee.edu/utk_graddiss/4952, the entire contents of which are incorporated herein by reference.

The post-consolidation thermal treatment step S260 provides thermal management in order to maintain a certain temperature level during the overall build process and, in particular, consistent thermal environment between deposition of successive layers of material. Because of the varying amount of melting in each layer, the post-consolidation thermal treatment step S260 may include a period of heating, a period of cooling, or a combination of one or more periods of heating and one or more periods of cooling, so that the overall heat balance is maintained. The post-consolidation thermal treatment step S260 returns the powder bed to that temperature that was achieved during the pre-consolidation step S240. For example, the post-consolidation thermal treatment step S260 includes heating both the agglomerated powder bed and the fully consolidated area utilizing the same parameters utilized by second step Preheat II in the pre-consolidation step S240 so that the temperature of the powder bed that was achieved as a result of performing the pre-consolidation step S240 is achieved at the conclusion of the post-consolidation step S260.

The post-heating step occurs following the consolidation step. The post-heating step behaves similarly to the Preheat stage where the same area of the powder bed is heated with the same parameters used in Preheat II, but now occurring after melting. The post-heat time is determined based on the heat already input from the previous preheat and consolidation steps.

Subsequent to the post-consolidation thermal treatment step S260, the method S200 either proceeds to continue to build up the component through processes to deposit a subsequent layer of material or proceeds to a post-build step including a cool-down step.

If proceeding to continue to build up the component, the method S200 comprises processes to deposit one or more subsequent layers of material. For example, after the post-consolidation thermal treatment step S260, the method S200 includes an indexing step S270 and a replenishment step S280, after which the pre-consolidation thermal treatment step S240, the consolidation step S250, and the post-consolidation thermal treatment step S260 occurs. The indexing step S270, the replenishment step S280, the pre-consolidation step S240, the consolidation step S250, and the post-consolidation step S260 can be repeated any number of a plurality of times until the component is in a final form.

In the indexing step S270, a position of the start plate 180 is moved by a distance corresponding to thickness of a subsequent layer. In example indexing steps, the position of the start plate 180 is moved by a distance of 40 to 70 microns, alternatively 45 to 55 microns or about 50 microns (i.e., 50±1.5 microns). Then, in the replenishment step S280, the current layer of the component is covered with a layer of the feedstock powder, such as by operation of the translatable arm 185 or similar device such as a rake or a doctor blade (typically translatable in the horizontal direction as indicted by arrow H), which helps to supply powder to the build tank and to distribute and level the covering layer.

Once building of the component with the EBM machine additive manufacturing process is complete, the method S200 proceeds to a post-build thermal treatment step S290. Either before or as an initial part of the post-build thermal treatment step S290, heat input to the component is removed. This can be accomplished, for example, by turning off the electron beam 120. With the heat input removed, the post-build thermal treatment step S290 proceeds to a cool-down step. In one embodiment, the cool-down step includes maintaining a vacuum atmosphere in the vacuum chamber 190 for 20±2 minutes followed by backfilling the vacuum chamber 190 with an inert gas to atmospheric pressure and then open-air, ambient cooling to room-temperature. In another embodiment, the cool-down step includes cooling the component to temperatures <100° C. under an inert gas, after which the chamber can be opened allowing for open-air, ambient cooling to room-temperature. An example inert gas suitable for use in either embodiment is helium gas. In both embodiments, the details of the cool-down step are designed to cool the as-built component slowly and uniformly so as to reduce the susceptibility of thermal cracking.

All values for parameters disclosed in the above discussion and tables are based on an Arcam EBM Spectra H with a LaB$_6$ crystal cathode.

One or more or all of the above parameters can be preprogrammed into a build package that can be used as instructions for operating the electron beam melting additive manufacturing equipment. Alternatively, one or more or all of the above parameters can edited directly through a user interface of the electron beam melting additive manufacturing equipment, such as through the "theme editor" function or equivalent.

Further, the geometric details of the component can be input into the EBM machine in an input step. An example input step includes entering a geometry of the component into a controller of the electron beam melting additive manufacturing equipment. The geometry of the component can be on a layer-by-layer basis or be on the basis of the whole component. In exemplary embodiments, the geometry of the component is embodied in a computer-aided design (CAD) model or an Additive Manufacturing File (AMF) file or a stereolithography contour (STL) file.

Figure 4B:
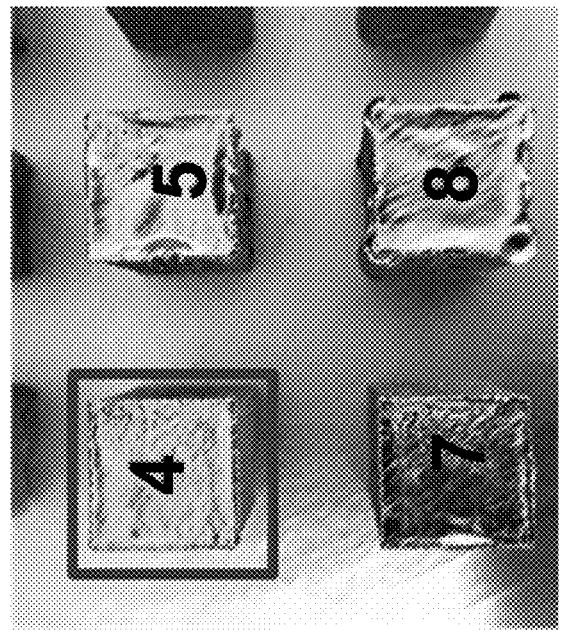
FIGS. 4A and 4B are images of example molybdenum structures manufactured by electron beam additive manufacturing.
Figure 4A:
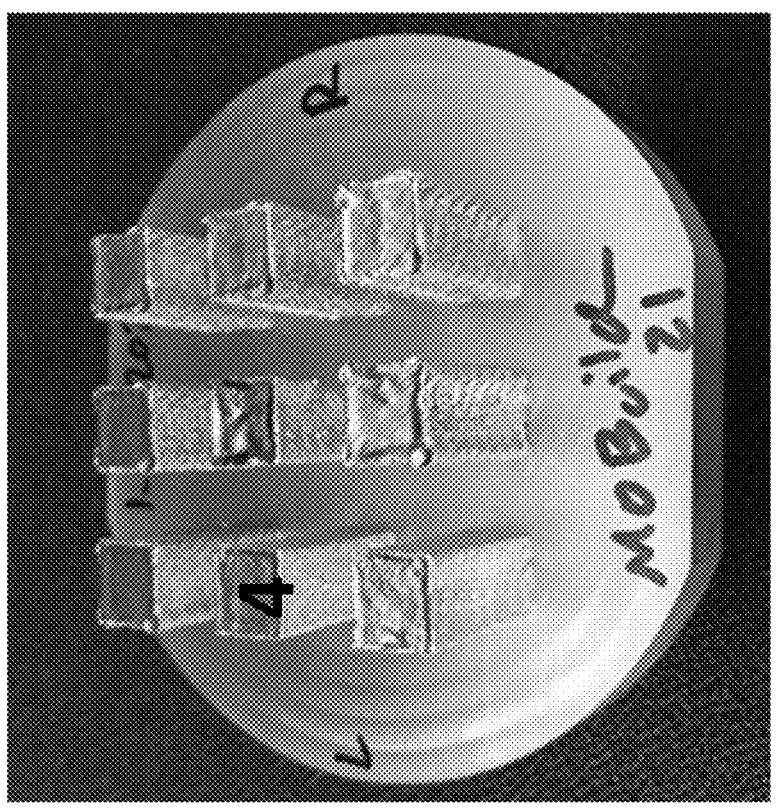

FIGS. 4A and 4B are images of example molybdenum structures manufactured by electron beam additive manufacturing. The molybdenum structures are rectangular prism-shaped and are shown seated on a pure molybdenum plate. The shown molybdenum structures were built layer-by-layer in the Z-axis direction (i.e., normal to the surface of the start plate) using the methods disclosed herein. FIG. 4B is a close-up image of four samples from FIG. 4A; the four samples are labeled 4, 5, 7, and 8. Sample 4 is also labeled in FIG. 4A.

Figure 5:
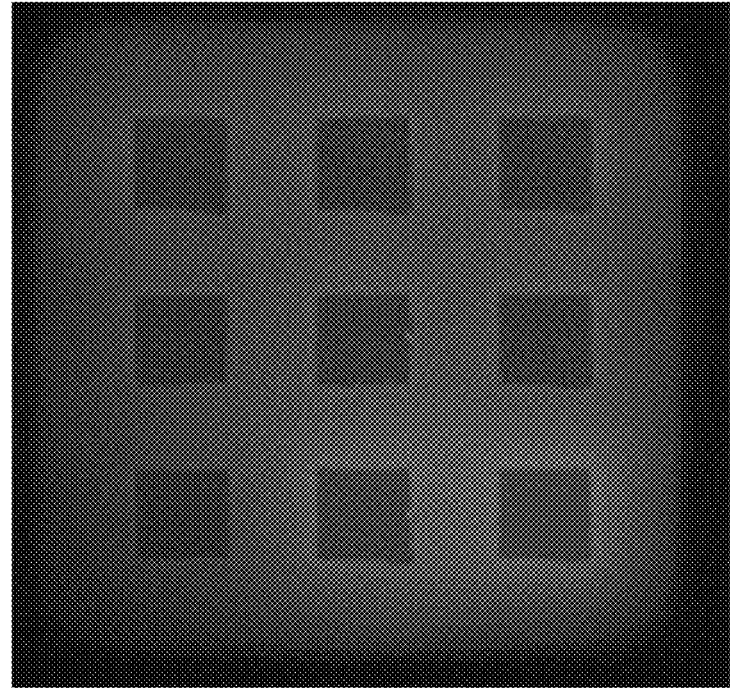
FIG. 5 is a near infrared (NIR) image of example molybdenum structures shown in FIG. 4A taken during the electron beam additive manufacturing process.

FIG. 5 is a near infrared (NIR) image of an example molybdenum structures shown in FIG. 4A taken during manufacturing by electron beam additive manufacturing. This NIR image demonstrates that non-destructive evaluation can occur during the EBM machine additive manufacturing process to, for example, monitor for structural flaws such as voids in the component being built. Such in-situ non-destructive evaluation can be used for quality control purposes.

Figure 6A:
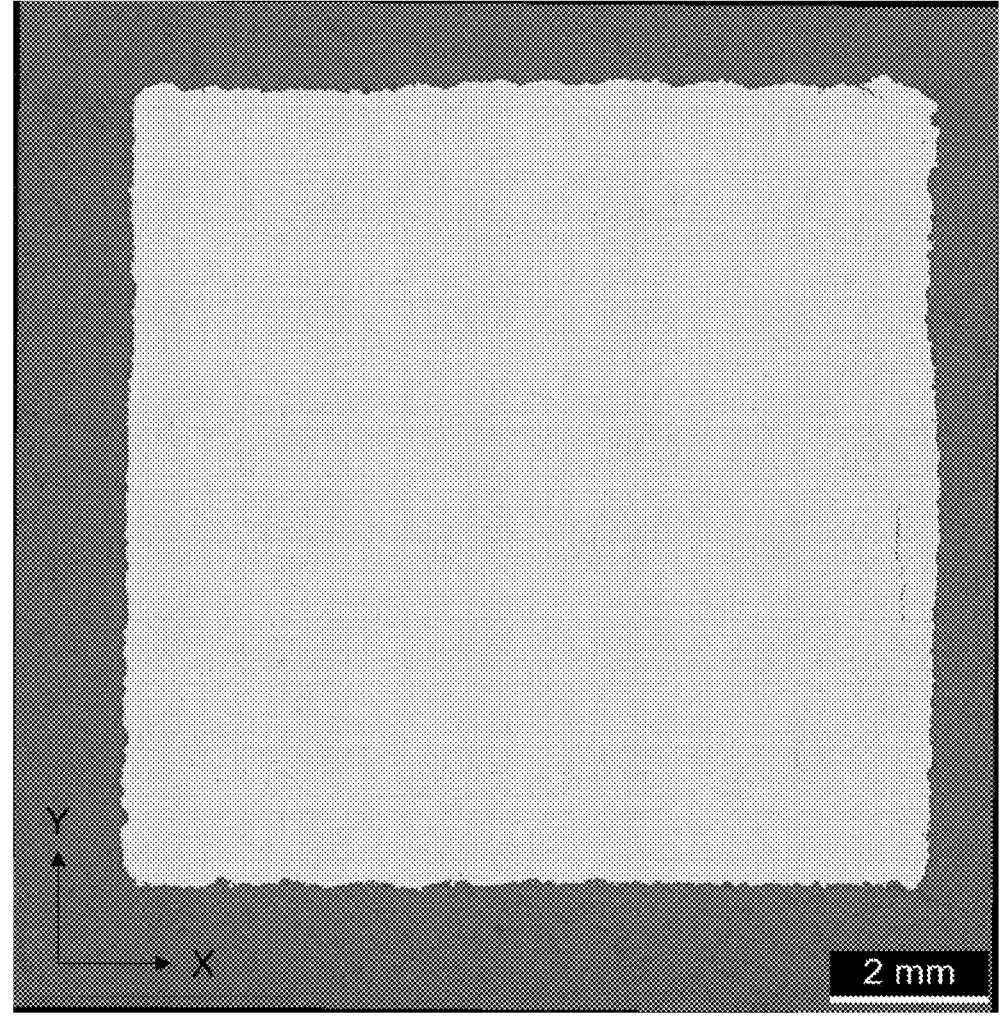
FIGS. 6A and 6B are metallographic images of a first cross-section (in the X-Y plane) (FIG. 6A) and a second cross-section (in the Y-Z plane) (FIG. 6B) of an example molybdenum structure manufactured by electron beam additive manufacturing.
Figure 6B:
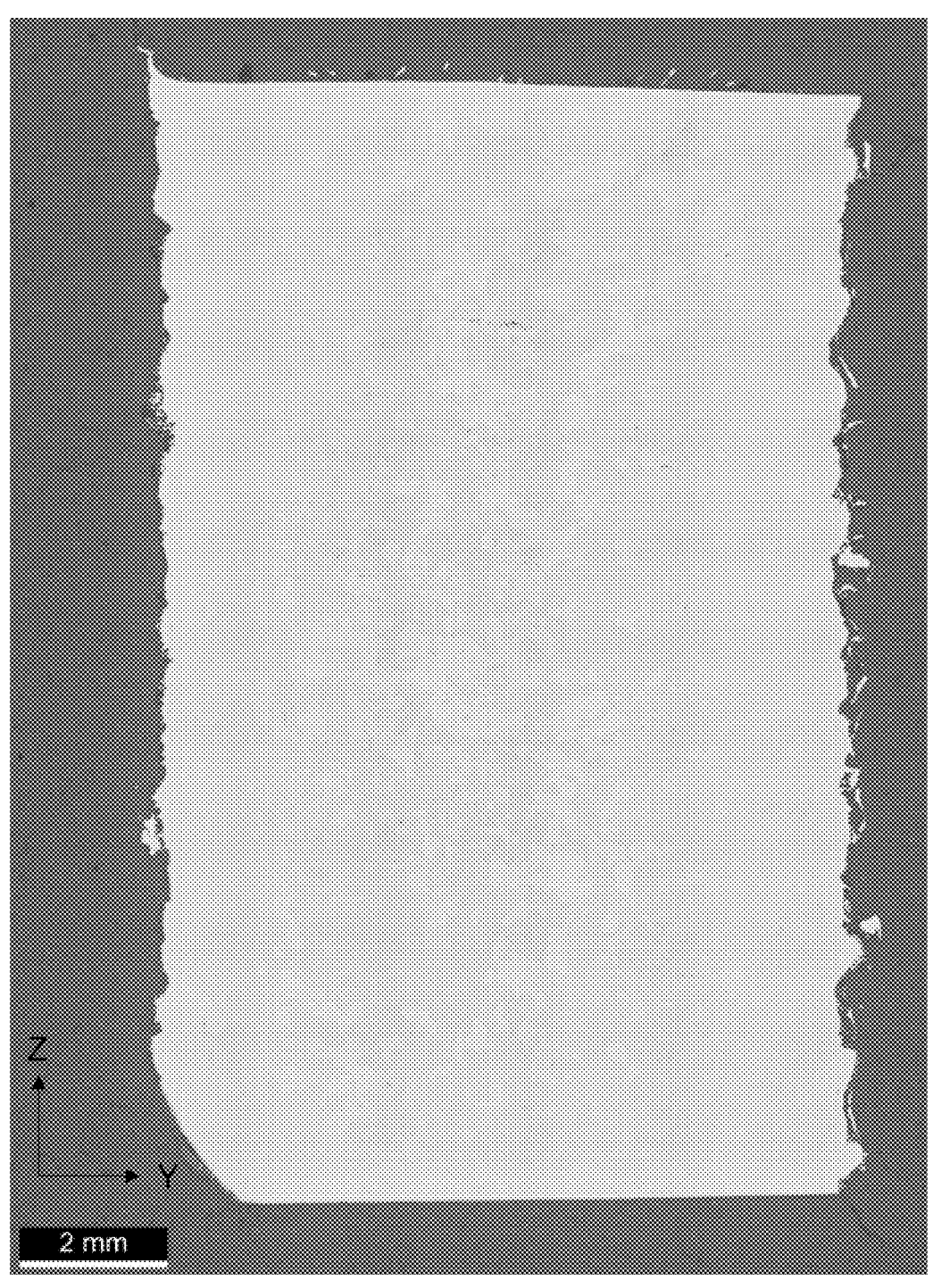

FIGS. 6A and 6B are metallographic images of a first cross-section (in the X-Y plane) (FIG. 6A) and a second cross-section (in the Y-Z plane) (FIG. 6B) of an example molybdenum structure manufactured by electron beam additive manufacturing. The example molybdenum structure corresponds to Sample 4 in FIGS. 4A and 4B. The metallographic images in FIGS. 6A and 6B are at a magnification of 100×. As seen from FIGS. 6A and 6B, the metallographic cross-sections were crack-free. FIG. 6B contains no cracks and FIG. 6A contains a single crack having a length of 1.5 mm (seen along right edge of FIG. 6A), meaning the total crack length in FIG. 6A is 1.5 mm. As used herein, crack-free means that a metallographic cross-section of the component viewed at 100× magnification contains internal cracks having a total crack length (where total crack length=a sum of the lengths of all visible cracks) of less than 4 mm or less than 3 mm or less than 2 mm. In some embodiments, crack-free means that a metallographic cross-section of the component viewed at 100× magnification contains no internal cracks. In this context, the cracks relevant to this evaluation can be one or more of metallurgical cracks, i.e., cracking at grain boundaries, and lack-of-fusion melt defects, i.e., caused by localized insufficient energy input resulting in the powder being not fully melted.

Also as seen from FIGS. 6A and 6B, the metallographic cross-sections were porosity-free and crack free. Both FIGS. 6A and 6B contain no pores. As used herein, porosity-free means (i) that a metallographic cross-section of the component viewed at 100× magnification contained no visible pores and (ii) that the sample had a density within 0.10 percent of theoretical density for that material where the density measurement was taken using helium pycnometry. For example, molybdenum having a theoretical density of 99.84%, a measured density of 99.75% or higher is within 0.10 percent of theoretical density).

Materials characterization testing was conducted on sample 4. The composition of Sample 4 is set forth in Table 5.

TABLE 5

| Composition of Sample 4 | | |
|---|---|---|
| Element | Amount (wt. %) | Measurement error |
| Mo | 99.980 | 0.002 |
| S | <0.0005 | 0.001 |
| N | 0.001 | 0.0005 |
| O | 0.009 | 0.002 |
| C | 0.009 | 0.0005 |
| Si | 0.002 | 0.002 |
| W | <0.002 | 0.01 |
| Fe | <0.0005 | 0.0005 |

In some embodiments, the component has a composition consisting of molybdenum or a molybdenum-based alloy having a purity level (of the molybdenum or a molybdenum-based alloy) of 99.0% or higher, alternatively 99.3% or higher or 99.5% or higher, such as 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, or 99.98% purity. In some embodiments, the component has a composition consisting essential of molybdenum or a molybdenum-based alloy. In embodiments in which the composition consists essential of molybdenum or a molybdenum-based alloy, other materials (including other metals and metal alloys) may be present in the component as long as the component has a composition consisting essentially of molybdenum or a molybdenum-based alloy having a purity level (of the molybdenum or a molybdenum-based alloy) of 99.0% or higher, alternatively 99.3% or higher or 99.5% or higher, such as 99.1%, 99.2%, 99.3%, 99.4%, 99.5%, 99.6%, 99.7%, 99.8%, 99.9%, 99.91%, 99.92%, 99.93%, 99.94%, 99.95%, 99.96%, 99.97%, or 99.98% purity. In some embodiments, the other materials are limited to impurity levels only and are not purposefully added to the composition.

In some embodiments of the component manufactured by the disclosed EBM machine additive manufacturing process have a composition consisting of or consisting essential of molybdenum or a molybdenum-based alloy, the component is fully dense. As used herein, fully dense has a density of 99.75% or higher, such as 99.80% or 99.85% or 99.00% or 99.95% or 99.98% or 99.99% or 100% dense, as calculated based on volumes determined by pycnometry using a gas pycnometer and He gas and pursuant to ASTM B923-21 Standard Test Method for Metal Powder Skeletal Density by Helium or Nitrogen Pycnometry.

For example, the density of Sample 4 was determined by pycnometry using a gas pycnometer and He gas to be 10.2045 g/cm³ (with a standard deviation of 0.0071 g/cm³). The pycnometer ran repeated cycles on the sample until readings for volume of three consecutive cycles were within a set standard deviation of 0.0015 cm³. The weight of the sample was determined by use of a calibrated analytical balance with a measurement error of 0.0001 g and was used with the volume determined by pycnometer to determine density. Based on the determined density of Sample 4 of 10.2045 g/cm³ and a theoretical density of 10.22 g/cm³ for pure molybdenum, Sample 4 had a density of 99.84%.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A method to manufacture a component by electron beam melting additive manufacturing, the method comprising:

a build set-up step including seating a start plate on a powder bed within a reaction zone of a vacuum chamber of an electron beam melting additive manufacturing machine, wherein the start plate has a composition consisting of molybdenum having a purity of 99.0% or higher and wherein the powder bed includes a first powder having a composition consisting of molybdenum having a purity of 99.0% or higher;

an initial thermal treatment step including positioning the start plate at a plate offset distance that is based on thermal expansion of the start plate during the initial thermal treatment step, heating the start plate to a first temperature that is sufficient to sinter the powder bed and is equal to or greater than 1040° C. and equal to or less than 1350° C., holding the start plate at the first temperature, and sintering a portion of the powder bed on which the start plate is seated;

covering at least a portion of a build surface of the start plate with a base layer of the first powder;

a pre-consolidation step including a first heating step in which the base layer is heated to a first preheat temperature and a second heating step in which the base layer is heated to a second preheat temperature, wherein the second preheat temperature is higher than the first preheat temperature, and wherein the first preheat temperature agglomerates the first powder of the base layer and the second preheat temperature densifies a portion of the agglomerated first powder;

a consolidation step including sintering a current layer of the component from the densified portion of the agglomerated first powder, wherein a rastering pattern used for sintering during the consolidation step includes an angular rotation that is non-90 degrees and that is based on a prime number or based on an integer multiple of a prime number; and a post-build step including a cool-down step.

2. The method according to claim 1, further comprising, after the consolidation step and before the post-build step:

a post-consolidation step including returning the powder bed to the second preheat temperature.

3. The method according to claim 2, further comprising, after the post-consolidation step and before the post-build step:

an indexing step including moving a position of the start plate by a distance corresponding to thickness of a subsequent layer;

a replenishment step in which the current layer of the component is covered with a layer of the first powder; and performing the pre-consolidation step and the consolidation step.

4. The method according to claim 3, wherein the post-consolidation step, the indexing step, the replenishment step, the pre-consolidation step, and the consolidation step are repeated a plurality of times until the component is in a final form.

5. The method according to claim 1, wherein the plate offset distance is equal to or greater than 0.1 mm and equal to or less than 0.3 mm.

6. The method according to claim 5, wherein an area of the densified portion of the agglomerated first powder has a boundary enclosing an area in which the layer of the component is to be formed, wherein the component has a composition consisting of molybdenum having a purity of equal to or greater than 99.0% and a density of equal to or greater than 99.75%, and wherein the component is crack-free and porosity-free.

7. The method according to claim 1, wherein an area of the densified portion of the agglomerated first powder has a boundary enclosing an area in which the layer of the component is to be formed.

8. The method according to claim 1, wherein the cool-down step includes:

removing heat input to the component; and (a) maintaining a vacuum atmosphere in the vacuum chamber for 20±2 minutes followed by backfilling the vacuum chamber with an inert gas to atmospheric pressure or (b) cooling the component to 100° C. under an inert gas.

9. The method according to claim 8, wherein the inert gas is helium.

10. The method according to claim 1, further comprising a geometry input step including entering a geometry of the component into a controller of the electron beam melting additive manufacturing machine.

11. The method according to claim 10, wherein the geometry of the component is a geometry on a layer-by-layer basis.

12. The method according to claim 11, wherein the geometry of the component is embodied in a computer-aided design (CAD) model or an Additive Manufacturing File (AMF) file or a stereolithography contour (STL) file.

13. The method according to claim 1, wherein the base layer has a thickness of 40 to 70 microns.

14. The method according to claim 1, wherein the component has a composition consisting of molybdenum having a purity of equal to or greater than 99.0% and a density of equal to or greater than 99.75%.

15. The method as in claim 14, wherein the component is crack-free.

16. The method as in claim 14, wherein the component is porosity-free.

17. The method as in claim 14, wherein the component is crack-free and porosity-free.

18. The method according to claim 1, wherein the component is crack-free.

19. The method according to claim 1, wherein the component is porosity-free.

20. The method according to claim 1, wherein the component is crack-free and porosity-free.

21. The method according to claim 1, wherein the component is a nuclear component.

22. A component for a nuclear reactor manufactured by the method according to claim 1.

23. The method according to claim 1, wherein the base layer has a thickness of 45 to 55 microns.

24. The method according to claim 1, wherein the first heating step of the pre-consolidation step includes a first plurality of parameters including current of 20 mA to 40 mA, a maximum number of sweeps of 300, a number of sweeps at maximum current of 50, a beam speed of 20,000 mm/s, a focus offset of 375 mA, and a line offset of 1 mm, and wherein the second heating step of the pre-consolidation step includes a second plurality of parameters including current of 40 mA to 45 mA, a maximum number of sweeps of 30, a number of sweeps at maximum current of 1, a beam speed of 16,100 mm/s, a focus offset of 375 mA, and a line offset of 1 mm.

25. The method according to claim 24, wherein the consolidation step includes a third plurality of parameters including focus offset, beam current, speed function, current compensation, and turning point function, wherein focus offset is 5 mA to 30 mA, wherein beam current is 2 mA to 30 mA, wherein a value for current compensation results in a ratio of ref scan line to beam current of 0.5 to 1.35, and wherein turning point function is defined by:

$$v_{Beam} = v_{input} * \left[ 1 + PEF * e^{-v_{input}\left(\left(EF_1 * \frac{i}{0.1}\right) - EF_2 * v_{input}\right)} \right]$$

where Pre-Exponent Factor (PEF) is 0.5 to 1.3 and Exponential Factor I (EF$_1$) is 0.0002 to 0.001.

26. The method according to claim 1, wherein the consolidation step includes a third plurality of parameters including focus offset, beam current, speed function, current compensation, and turning point function, wherein focus offset is 5 mA to 30 mA, wherein beam current is 2 mA to 30 mA, wherein a value for current compensation results in a ratio of ref scan line to beam current of 0.5 to 1.35, and wherein turning point function is defined by:

$$v_{Beam} = v_{input} * \left[ 1 + PEF * e^{-v_{input}\left(\left(EF_1 * \frac{i}{0.1}\right) - EF_2 * v_{input}\right)} \right]$$

where Pre-Exponent Factor (PEF) is 0.5 to 1.3 and Exponential Factor I (EF$_1$) is 0.0002 to 0.001.

* * * * *